March 3, 1970   R. W. SAUMSIEGLE   3,498,868
METHOD OF JOINING PLASTIC
Filed Feb. 24, 1966

INVENTOR.
ROBERT W. SAUMSIEGLE
BY
Barlow & Barlow
ATTORNEYS

United States Patent Office 3,498,868
Patented Mar. 3, 1970

3,498,868
METHOD OF JOINING PLASTIC
Robert W. Saumsiegle, Needham, Mass., assignor to G. T. Schjeldahl Company, a corporation of Minnesota
Filed Feb. 24, 1966, Ser. No. 529,701
Int. Cl. C09j 5/00
U.S. Cl. 156—322    2 Claims

ABSTRACT OF THE DISCLOSURE

A method of heat sealing one element to thin plastic wherein the surfaces of the plastic and the element are fused together that includes the step of preheating the element and in moving the element into contact with the thin plastic film and applying pressure to the parts. Such a method finds application in joining thin wall plastic bag film to spout flanges of substantial thickness.

---

In the joining of a thick gage plastic form to one or more thin gage plastic film layers, certain problems are encountered, especially when this joining is by machine operation. It is known that where molded plastic shapes (such as a spout with a flange) are encountered, that some parts of the molded shape are under many stresses which are not apparent in such a shape when cold except when viewed under ultra violet inspection. However, if such a shape is heated all over, distortion will occur due to the relieving of these stresses and the material will tend to return to its original form prior to the molding, and this distortion must be avoided.

Further, it is known that if a certain thinning occurs of the thin gage plastic material at the point of the joint, there will occur distortion stresses and cracking at the thinned portion of the film. Therefore, care must be taken to avoid such thinning at the point of contact of the parts.

This invention comprises pre-selecting an area to be heated of the surface of the shape to be bonded to one or more layers of thin gage plastic film such, for example, as a portion of the flange of the spout which strucure will be used by way of example, and selecting that area so that the nonheated areas surrounding the heated area or close thereto are sufficient to prevent distortion of the shape, thus maintaining the shape in its desired form in which it has been molded, and in this instance of the above spout illustration, preventing any distortion of the flange of the spout. Also, this invention contemplates providing at this heated area a sufficient mass of material so that a heat reservoir will be created which will maintain some of the initially supplied heat while the article or shape is being moved from one position to another where the thin gage plastic film is to be applied, and accordingly the invention also includes the provision of sufficient mass of the shape at the area to be heated so as to provide the desired heat reservoir for subsequent operations. The use of an adequate mass may also enter into the choice of the area to be heated, as additional stresses may be occurring because of a thickened shape. Thus, there is a balancing between the area to be heated and the thickness of the shape to be attached to the engaged plastic film.

The invention also comprises carrying a sufficient amount of heat so that a sufficiently light pressure to only maintain contact between the engaged film and the heated area will be adequate to achieve a joining between the two, this pressure to be such that only contact is desired and no distortion of the shape of either of the parts to be joined will occur, thus preventing stress cracking which may occur by reason of thinning of the parts.

An object of this invention is to provide sufficient heat for fusion between two layers of plastic material of substantial cross sectional thickness differential by other means than heating through the thin wall material to raise the temperature of the heavy wall to fusion temperature.

Another object of this invention is to join the surface of a thin plastic material to a heavy plastic material by light engagement of the thin material to the heavy material where sufficient heat previously induced into the heavy material would provide sufficient heat to raise the temperature of the thin materal to the fusion temperature, thereby joining the two materials during such engagement.

A still further object of the invention is to prevent the occurring of stress cracks and thinning of the materials to be attached, especially the thin gage plastic film, and thus avoid stress cracks at the point of attachment.

A more specific object of this invention is to join the surface of a thin plastic material to a heavy plastic material by light engagement of the thin material by an element providing a surface temperatune on the thin material no greater than the fusion temperature of the plastic where sufficient heat has previously been induced in the heavy material to raise the temperature of the thin material to and above the fusion temperature, thereby joining the two materials and retaining the integrity of the thin material.

With these and other objects in view, the invention consists of certain novel features of construction as will be more fully described and particularly pointed out in the appended claims.

Figure 1:
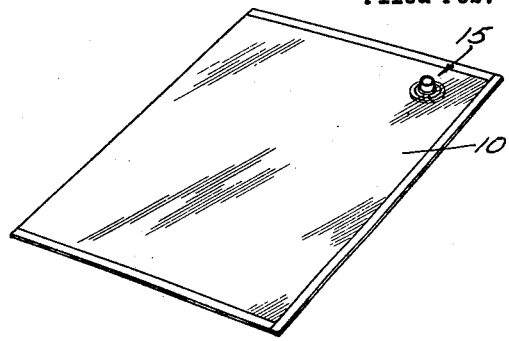
FIG. 1 is a perspective view of a completed thin gage plastic bag with the spout attached thereto.
Figure 2:
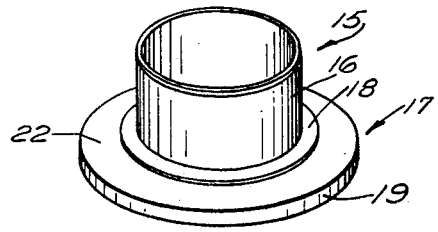
FIG. 2 is a perspective view of the spout on a much larger scale.
Figure 3:
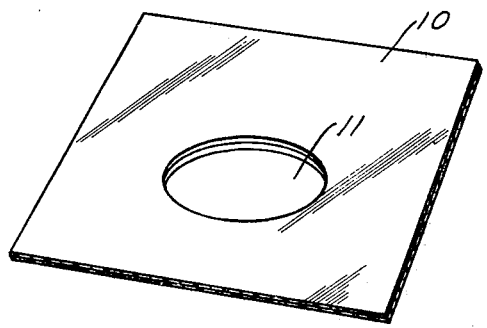
FIG. 3 is a fragmental section of one wall of the bag showing the opening therein through which the spout is to be placed.
Figure 4:
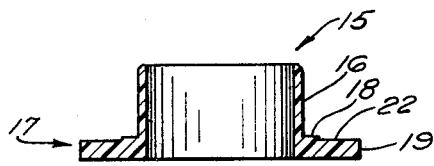
FIG. 4 is a sectional view of the spout showing the relative thickness of the flange thereof as related to the thickness of the thin gage plastic film of the bag to which it is to be attached.

Referring now to the drawings which illustrate by way of example one practical application of the invention, 10 shows a two-ply thin gage plastic film which is a portion of a bag to which a spout is to be applied. There is an opening 11 through the two plies of film which are to form one wall of the bag. The spout which is to be applied is designated generally 15 and comprises a neck portion 16 with a flange 17 extending therefrom at the lower edge thereof which has a thickened portion 18 near the tubular neck portion 16 and a peripheral portion 19 extending radially for the remainder of the diameter thereof.

Figure 5:
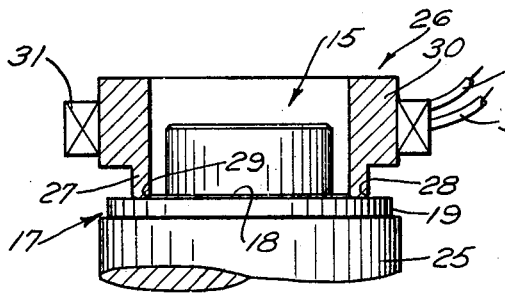
FIG. 5 is a sectional view illustrating the heating element as applied to the flange of the spout.
Figure 6:
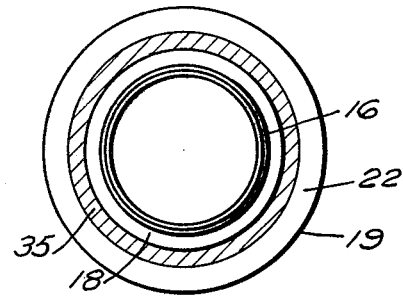
FIG. 6 is a top plan view showing a shaded portion indicating the heated area of the flange.
Figure 7:
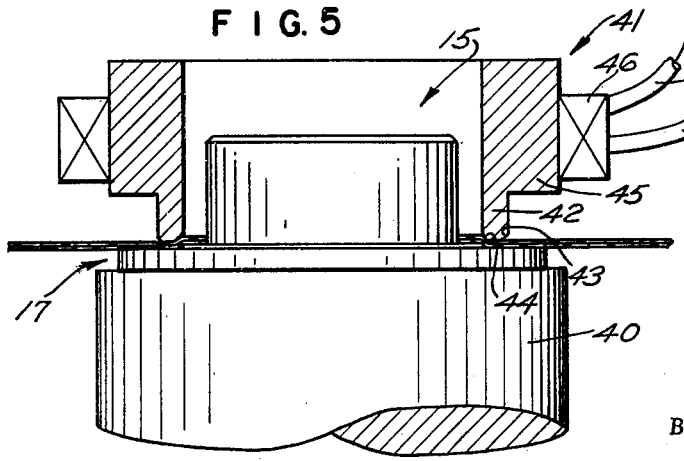
FIG. 7 is a sectional view showing the plastic film as applied to the spout over the flange thereof and a heating element applied thereto.

The spout 15 as shown in FIG. 5 is positioned upon a plunger 25 above which it is conveyed, which plunger raises the spout 15 into contact with a heating element 26 comprising a portion 27 rounded at its inner and outer edges as at 28 and 29 and enlarged as at 30 to give it additional heat carrying mass while it is surrounded by a coil 31 from which there are leads 32 and 33 and which provide for heating the element 26. The portion 27 of the element is of such a size that it will provide a circular area of heating as at 35 (seen in FIG. 6) which is closely adjacent to the thicker portion 18 of the flange but well inwardly from the outer periphery of the flange and providing a circular supporting area at 22 about the heated area 35. The surface temperature of the element is above the fusion temperature of the plastic material so as to quickly heat this circular area 35 above its melting point, (for example may be approximately 380° F. with polyethylene) and yet this flange is so supported by the surrounding areas 18 and 22 of the flange and the supporting surface upon which it rests that the molded plastic shape or spout remains undistorted. The contact of the element with the plastic should be of short duration consistent with lack of distortion of the plastic. The curved edges 28 and 29 of this portion 27 are important so as not to injure by any sharp corners the heated area at the inner and outer edges thereof.

In some cases it may be necessary to apply heat to the plastic material from both sides. Such situations would arise when the thickness of the material is such that it would be impossible to have a band of material fully raised to near the melting point of the material.

After such heating ocurs in the specific example herein, the flange so heated is transferred from its heating position to a second station where the thin gage plastic film 10 with its opening 11 is fed in to be applied. This spout is then raised by another plunger 40 up through the opening 11 in the film 10, and a pressure element 41 similar to the element 26 and having a portion 42 with rounded corners 43 and 44 is brought into contact with very light pressure on the plastic film urging it to and toward the flange of the spout. If the materials are of a cross sectional relationship that the heavy material does not have enough heat at engagement with the thin material to completely activate the thin material, a minimum amount of heat would be added to the thin material, as for example 260° F. for polyethylene, through the pressing element 41 that holds a thin wall in contact with the heavy wall by providing at the enlarged portion 45 an electrical heating coil 46 with leads 47, 48. This structure would yield a true conductive heat source, although crystal oriented solid material—methyl methacrylate for low temperature (see U.S. Patent 2,153,406) or ruby for high temperature—for example may be used as the pressure element with a radiant heat source. The heat provided by this element 41 will be equal to or less than the heat first applied to the flange by element 26, and the pressure will be very light, just enough to maintain physical contact between the two parts 10 and 17 and insufficient to provide any thinning of the film at its point of contact. The heat will be only sufficient to cause the plastic film to become fluid or mobile, sufficient heat having been retained in the ring 35 so that over a short dwell time, on the order of one second in the example illustrated herein, molecular diffusion will take place on the interface and thereby provide a weld or joining of the parts one to the other. It will be appreciated that various plastic materials will require different dwell periods.

To achieve a true heat reservoir capability of the part or flange 17, it has a thickness many times the thickness of the thin gage plastic film. For instance, it might be ten times the thickness of one of the plastic plies of the wall 10 or five times the thickness of the two plies of the wall 10. With a larger reservoir other ratios can be used. As previously mentioned, the temperature applied to the flange may be well above the melting point of the flange, but the time interval during which it is applied will be short. There will, of course, depending upon the material, be a certain relationship between the time interval and the amount of heat applied so as to obtain the necessary degree of fluidity in the desired interval of time. Thus the type of seal may be easily controlled by this invention. For example the type of seal can be easily controlled from a strippable or tack seal to an air tight or fusion seal by varying the temperature parameter. As before explained, the subsequent heat at the point of joining of the thin plastic film and the flange will be only sufficient to have an interfacial temperature in the fluid region of the plastic. Thus, under some conditions where an extremely thin plastic film is to be joined, sufficient heat may be available from the thick flange to achieve fluidity in the film without the application of heat at the second stage or joining station.

It will be appreciated that after the ring of heating occurs at 35 and after the joining, there will be heat transfer into the surrounding parts which will be substantial and afford a cooling effect immediately to the parts joined. Further it will be appreciated that this method is not limited to the shape of the parts, the circular configuration being purely illustrative.

I claim:
1. The method of securing thin gage plastic film to a plastic shape of many times the thickness of the film comprising preheating an area of the surface of the shape to be welded above the fusion temperature thereof, moving the preheated shape into contact with said film, applying pressure and heat of less than the fusion temperature of said film to the film and shape to insure molecular diffusion between the thin film and the thick shape.

2. The method of claim 1 wherein the plastic is polyethylene and the ratio of the thickness of the shape to the film is in the range of between 5 and 10 to 1 and the heat applied to said area during the preheating step is approximately 380° F. and wherein heat of approximately 260° F. is applied with said pressure to insure the molecular diffusion between the thin film and the thick shape.

References Cited

UNITED STATES PATENTS

| 3,325,332 | 6/1967 | Cleereman | 156—322 |
| 3,406,055 | 10/1968 | Rubel | 156—322 X |
| 2,387,566 | 10/1945 | Custers | 156—322 X |

HAROLD ANSHER, Primary Examiner

U.S. Cl. X.R.

156—293, 306